United States Patent
Grunert et al.

[19]

[11] Patent Number: 5,904,334
[45] Date of Patent: May 18, 1999

[54] QUIET HIGH FLOW CONTROL VALVE

[75] Inventors: Jordan Bryce Grunert, Beaver; James R. Shannon, Pittsburgh, both of Pa.

[73] Assignee: The Horton Company, Pittsburgh, Pa.

[21] Appl. No.: 08/814,783

[22] Filed: Mar. 10, 1997

[51] Int. Cl.⁶ .......................... F16K 31/385; F16K 31/40; F16K 47/02; F16K 47/08
[52] U.S. Cl. .......................... 251/120; 137/846; 138/45; 251/30.04; 251/38; 251/45
[58] Field of Search .............................. 251/30.01, 30.02, 251/30.03, 30.04, 30.05, 38, 45, 46, 118, 120; 138/45, 46, 44; 137/846, 849

[56] References Cited

U.S. PATENT DOCUMENTS

| | | | |
|---|---|---|---|
| 1,051,069 | 1/1913 | Bohme | 239/597 |
| 1,185,585 | 5/1916 | Bower | 251/121 |
| 2,500,750 | 3/1950 | Halenza | 251/120 |
| 2,524,764 | 10/1950 | Burke | 137/849 |
| 2,562,315 | 7/1951 | Kempton | 251/38 |
| 2,712,324 | 7/1955 | Lund | 251/38 |
| 2,815,041 | 12/1957 | Rimsha et al. | 251/38 |
| 2,953,248 | 9/1960 | Troland | 138/45 |
| 3,416,736 | 12/1968 | Marik | 239/571 |
| 3,738,607 | 6/1973 | Peruglia | 138/45 |
| 3,768,771 | 10/1973 | Dicken, Jr. | 251/38 |
| 4,306,684 | 12/1981 | Peterson | 239/597 |
| 4,843,770 | 7/1989 | Crane et al. | 51/439 |
| 5,050,805 | 9/1991 | Lloyd et al. | 239/424 |
| 5,226,446 | 7/1993 | Cooper | 137/517 |
| 5,288,027 | 2/1994 | Herstek et al. | 239/594 |
| 5,592,966 | 1/1997 | Gates | 137/849 |
| 5,634,229 | 6/1997 | Stoltz | 137/849 |

Primary Examiner—George L. Walton
Attorney, Agent, or Firm—Sixbey Friedman Leedom & Ferguson; Donald R. Studebaker

[57] ABSTRACT

A dispensing valve for dispensing a liquid including a valve housing having a fluid inlet and a fluid outlet, an armature positioned in the housing, the armature being reciprocal between an open and closed position, a sealing disk fixedly secured to a sealing end of the armature for sealing engaging a valve seat positioned about the fluid outlet for providing selective fluid communication between the fluid inlet and the fluid outlet and a flow control device positioned in the fluid outlet for providing a substantially quiet and constant flow of liquid through the fluid outlet. The flow control device including a high pressure region and a low pressure region downstream of the high pressure region with the high pressure region of the flow control device including a flow control orifice having an inside diameter less than a diameter of the fluid outlet and the low pressure region of the flow control device intersects the high pressure region of the flow control device. Additionally, the low pressure region has a first dimension less than the inside diameter of the orifice and a second dimension greater than the inside diameter of the orifice, with the second dimension being transverse to the first dimension. The body of the aid flow control device includes a substantially cylindrical portion and a substantially conical portion with the conical portion being positioned downstream of the cylindrical portion which includes the high pressure region while the conical portion includes said low pressure region.

14 Claims, 3 Drawing Sheets

QUIET HIGH FLOW CONTROL VALVE

TECHNICAL FIELD

The present invention relates to the control of fluid flow in fluid dispensers or domestic appliances and more particularly to a valve and flow control device which provides quiet flow so as to enhance the overall acceptance of such control valves by consumers.

BACKGROUND OF THE INVENTION

Devices for controlling the flow rate in a control valve, in particularly, the flow control of water through household appliances, such as dishwashers, clothes washers, refrigerator ice makers and similar devices are well-known. In providing flow rate control to household appliances connected to municipal water supplies, it is desired to provide a generally constant flow rate to the appliance while minimizing the audible noise generated by the fluid flow therethrough. Various types of flow control devices have been employed for this purpose and a particular well-known device is an elastomeric washer which deforms resiliently under increasing supply pressure to restrict the flow orifice size thereby maintaining a constant flow rate therethrough.

However, in providing flow control to the water inlet of the appliance, problems have been experienced in excessive noise, where the restrictions of the flow control device have produced cavitation. In cases where the flow control is carried out adjacent an electrically operated water inlet valve, the noise problem has been particularly exacerbated by the flow cavitation causing resonant vibration of the surrounding valve body structure. This problem has been particularly troublesome in appliance water inlet valves having a body structure rigidedly secured to a surrounding metal frame or cabinet of the appliance.

Where an appliance water inlet flow control device is required to control substantial restriction to accommodate relatively high water supply pressures for maintaining a constant flow rate to the appliance inlet, severe high frequency vibration has been encountered as cavitation occurred at the flow control device and the resulting noise is perceived to be quite objectionable to the consumer.

In most fluid flow systems, the water held therein is eventually allowed to be discharged into a container or appliance and is selectively controlled by an electronically actuated valve. When opened, fluid flowing from a relatively high pressure source passes through an orifice to a low pressure region within the control valve. In doing so, a screech or similar noise is readily apparent as the valve is initially opened. Even the flow through piping once the valve is opened can generate an objectable noise. In the past, various means of designing the flow path through the control valve have been attempted to reduce the level of water expulsion noise so as to produce a quieter environment. Many of these solutions can be quite elaborate, sizable, or expensive.

With respect to the present invention, audible noise of fluid flowing through an electronically operated solenoid water dispensing valve can often times be annoying to the consumer. In this instance, water at a high pressure is contained and then upon the energization of the solenoid, an opening is attained wherein the water will expel to the lower pressure region. In the past, efforts were made to redesign and curve the flow/path to reduce the water splash within the low pressure region, however, due to the high velocity of the fluid flowing through the control valve, such modifications rarely meet with success in reducing the audible noise generated by the flow of fluid through the valve.

In an effort to reduce the noise of fluid flowing through a conduit, U.S. Pat. No. 5,226,446 discloses a flow noise reduction assembly having a fixed flow limiting orifice or an inlet pressure responsive flow control washer having a flow limiting orifice. In either manner, a conically faced diverter is disposed closely adjacent to the down stream face of the orifice and an expansion chamber is disposed down stream of the flow diverter for noise attenuation. Therein, fluid flowing through the conduit and the flow limiting orifice is diverted by a restriction in the flow path in order to disperse fluid flowing through the orifice into an expansion chamber immediately adjacent the down stream face of the orifice. The diverter is positioned in the flow stream and connected to an outer rim by spaced radially spokes which over time will wear requiring the diverter to be maintained and serviced on a regular basis.

Therefore, there is clearly a need for an inexpensive means for quieting the flow of fluid in a fluid dispenser adjacent a control valve with such means being inexpensive to incorporate into the existing supply valve or into new supply valves and which requires little if any maintenance over the life of the appliance.

SUMMARY OF THE INVENTION

A primary object of the present invention is to overcome the aforementioned shortcomings associated with prior art devices.

A still further object of the present invention is to enhance the operation of fluid valves in fluid dispensing applications.

Yet another object of the present invention is to provide a dispersing element which causes fluid passing through the control valve to spread the fluid flow in a direction towards the side wall of the channel.

A still further object of the present invention is to provide a dispersing mechanism which causes the water to spread in a perpendicular direction towards the side wall of the output conduit of the control valve.

An additional object of the present invention is to provide a substantially conical flow dispersing device which includes an elongated slit which causes fluid passing through an internal orifice within the conical section to be fanned in a direction towards the side wall of the conduit along the length of the dispersing element.

A still further object of the present invention is to provide a dispersing element which significantly reduces the flow rate of fluid through the device so as to reduce audible sound of the fluid passing therethrough.

A still further object of the present invention is to provide a flow dispersing device which may be readily positioned in the outlet of an electronically operated control valve so as to reduce the audible noise of the fluid passing therethrough.

These as well as additional objects and advantages of the present invention are achieved by providing a dispensing valve for dispensing a liquid including a valve housing having a fluid inlet and a fluid outlet, an armature positioned in the housing, the armature being reciprocal between an open and closed position, a sealing disk fixedly secured to a sealing end of the armature for sealing engaging a valve seat positioned about the fluid outlet for providing selective fluid communication between the fluid inlet and the fluid outlet and a flow control device positioned in the fluid outlet for providing a substantially quiet and constant flow of liquid through the fluid outlet. The flow control device including a high pressure region and a low pressure region downstream of the high pressure region with the high pressure region of the flow control device including a flow control orifice having an inside diameter less than a diameter of the fluid outlet and the low pressure region of the flow control device intersects the high pressure region of the flow control device. Additionally, the low pressure region has a first dimension less than the inside diameter of the orifice and a second dimension greater than the inside diameter of the orifice, with the second dimension being transverse to the first dimension. The body of the aid flow control device includes a substantially cylindrical portion and a substantially conical portion with the conical portion being positioned downstream of the cylindrical portion which includes the high pressure region while the conical portion includes said low pressure region.

These as well as additional objects and advantages of the present invention will become apparent from the following detailed description when read in light of the several figures.

DETAILED DESCRIPTION OF THE PRESENT INVENTION

Figure 1:
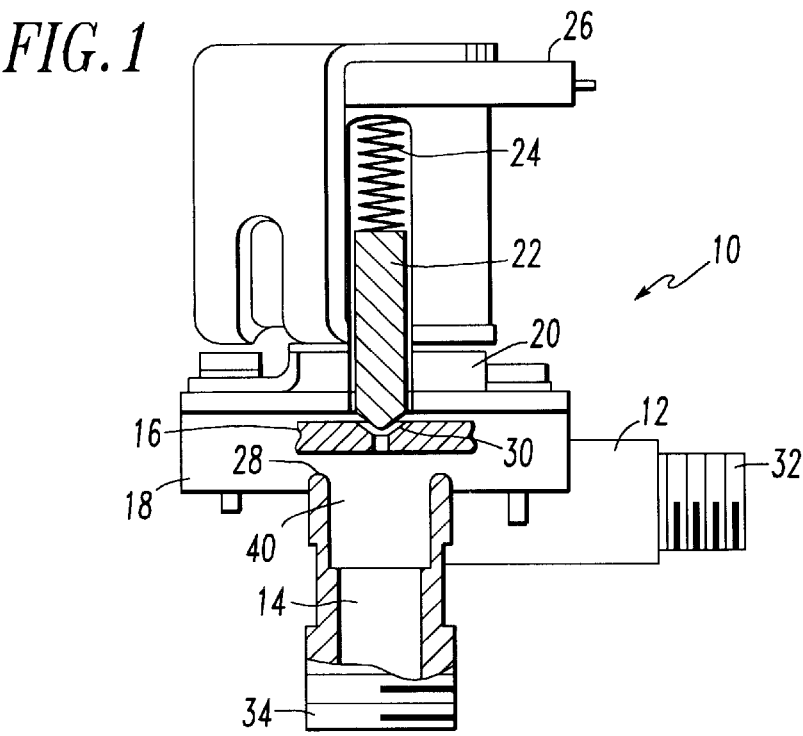
FIG. 1 is a cross-sectional view of a typical electronically actuated control valve construction.
Figure 2:
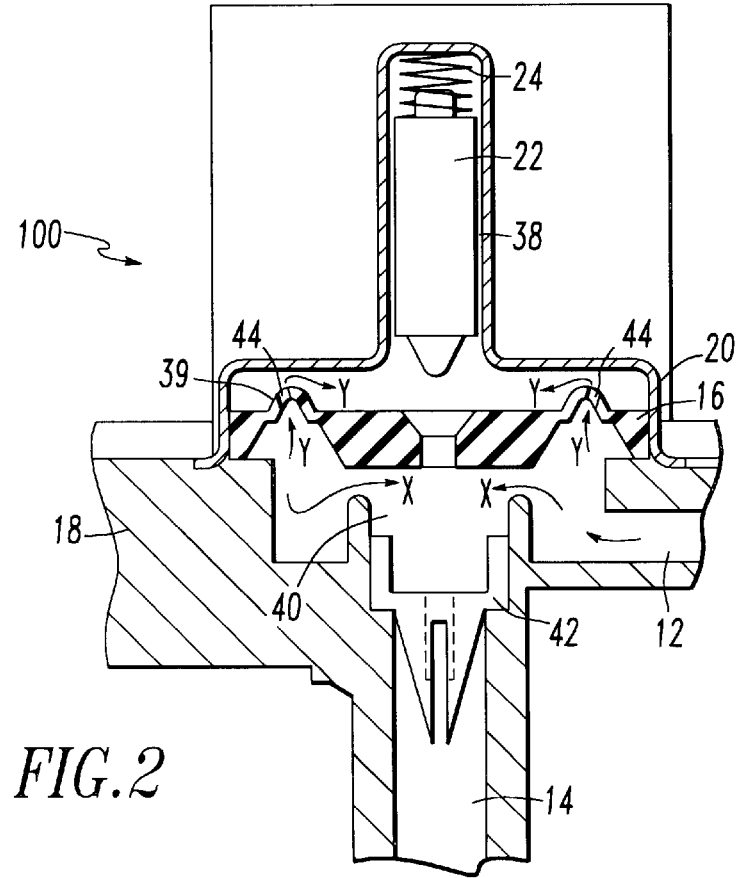
FIG. 2 is a cross-sectional view of a electronically actuated control valve incorporating the noise reduction device in accordance with the present invention.

Referring now to the several figures, the present invention will now be described in greater detail hereinbelow. Initially, reference is made to FIG. 1 wherein like reference numerals will be used to designate like elements throughout the several figures.

FIG. 1 illustrates a conventional control valve for controlling fluid flow in fluid dispensers or domestic appliances requiring the interruption of what would otherwise be a substantially continuous flow of fluid therethrough. The control valve 10 includes a fluid inlet 12 and an outlet 14 which are fluidly isolated from one another by way of a displaceable diaphragm 16. Also positioned within the valve housing 18 is a sealing guide or armature guide 20 which reciprocally receives an armature 22 which is biased in a closed position by way of a spring 24. Movement of the armature 22 within the housing 18 is controlled by way of electronic pulses supplied to a coil 26. Generally in the rest position, the diaphragm 16 sealingly engages the uppermost end 28 of the outlet 14 and the armature 22 sealingly engages the valve seat 30 formed in the diaphragm 16, with the armature 22 being biased in the closed position by way of spring 24. When an electronic pulse is sent to the coil 26, the armature 22 is displaced in an upward direction against the force of spring 24 in order to permit fluid pressure from the inlet 12 to displace the diaphragm 16 thus commencing fluid flow from the inlet 12 to the outlet 14 in a known manner. It is also noted that the valve 10 may be readily positioned within new or existing fluid flow systems by way of the threaded regions 32 and 34 on both the inlet 12 and the outlet 14, respectively. As discussed hereinabove, there are various uses for the type of valve illustrated in FIG. 1. The most typical is that of a water valve which upon command initiates and maintains water flow to fill a container to a predetermined quantity after which the flow through the control valve is stopped. It should be noted that due to variations in supply pressures, the flow rate through the valve illustrated in FIG. 1 is not consistent over the full range of supply pressures.

As discussed hereinabove, one noticeable occurrence during the flow of fluid through the control valve is the noise generated within a splash region 40 of the fluid outlet 14. The audible effects generated in this region of the control valve are often times annoying the consumer. It is an object of the present invention to limit the noise generated within the splash region.

Referring now to FIGS. 2–6, the essence of the present invention will now be described in greater detail. As with the valve 10 illustrated in FIG. 1, the valve 100 includes an inlet 12 and an outlet 14 formed within the housing 18. Also positioned within the housing 18 is a diaphragm 16, sealing armature guide 20, armature 22 and biasing spring 24.

While not illustrated, the valve 100 includes a coil 26 for controlling movement of the armature 22 by way of electrical pulses applied to the valve.

Positioned within the splash zone 40 of the valve 100 is a flow conditioning element 42 which conditions the flow of fluid passing through the control valve into the outlet 14. The particular structure of the flow conditioning element 42 quiets the fluid flow through the valve 100 and exiting the outlet 14. The particular structure of the flow conditioning element 42 will be described in greater detail hereinbelow with reference to FIGS. 3–6.

In addition to the flow conditioning element 42, the operation of the control valve 100 is quieted by dampening the vibration of the armature 22 when in the open condition. That is, often times noise related to the energization of a coil and movement of the armature as well as maintenance of the armature in the open condition creates a vibrating noise which can be an annoyance to the consumer. When energized in a known manner, the armature 22 is retracted against the force of the spring 24 and often times it vibrates within the chamber 38. With the valve illustrated in FIG. 2, when the armature 22 is displaced, fluid pressure from the fluid passing through the inlet 12 displaces the diaphragm 16 which permits fluid flow in the direction of arrows X. Additionally, such that movement of the diaphragm 16 is not carried out against fluid pressure, fluid also passes through openings 44 formed in the flex region 39 of the diaphragm as illustrated by arrows Y. In this regard, fluid pressure fills the cavity 38 formed by the sealing guide 20 and thus fills the space about the armature 22. By providing laminar flow within the interior of the control valve, a dampening effect about the armature is realized. With the pressure equalization being maintained about the diaphragm 16, the armature tends to float in a quiet region so as to dampen the vibration of the armature. In doing so, the audible hum experienced with many valves of this type is minimized.

Figure 3:
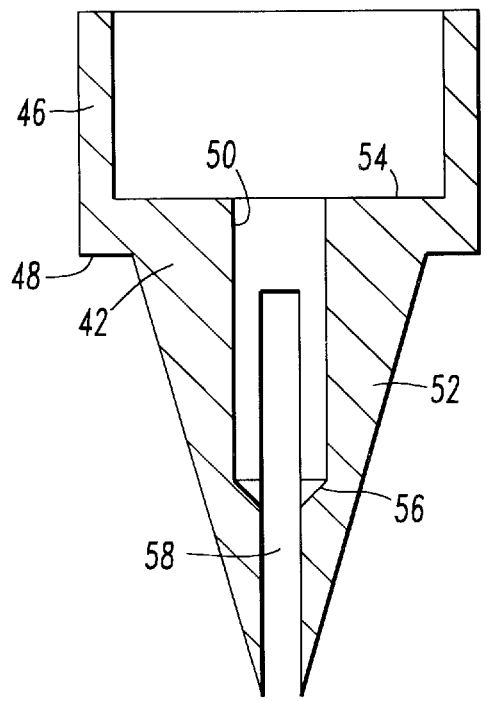
FIG. 3 is a cross-sectional view of the noise reduction device of the present invention.
Figure 4:
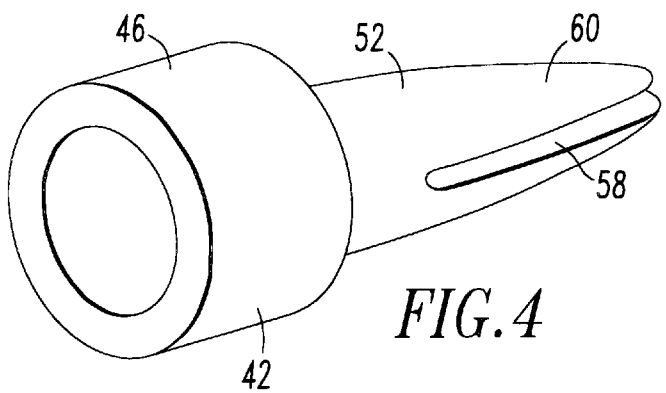
FIGS. 4 and 5 are perspective views of the noise reduction device formed in accordance with the present invention.
Figure 5:
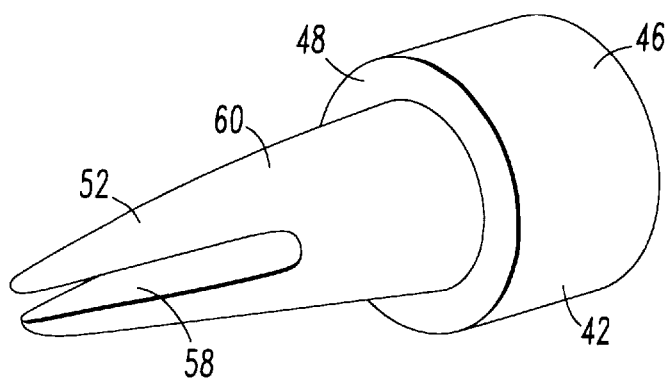

Referring now to FIG. 3, the flow conditioning element 42 includes a support rim 46 and shoulder 48 which engage inside surface of the fluid outlet 14 so as to properly position the flow conditioning element 42 within the outlet passage. The specific construction of the supporting structure may vary depending upon the particular form of the outlet flow passage 14. As can be further seen from FIG. 3, the flow conditioning element 42 includes a central passage 50 which extends part way through the cone region 52 of the conditioning element. This passage 50 acts as a flow rate control orifice and may change in geometry due to fluid pressure on the upstream side of the flow conditioning element 42. That is, the flow conditioning element 42 may be formed of a resilient material which permits the orifice 50 to change in size depending upon fluid pressure applied to an upper surface 54 of the flow conditioning element 42. With this characteristic being somewhat similar to previous flow rate control devices.

As will be appreciated, the orifice 50 terminates within the cone region 52 at a point 56 therein. Intersecting the orifice 52 is a diametrical slot 58. This slot being best illustrated in FIGS. 4 and 5. The narrow slit extends diametrically across the entire cone region of the flow conditioning element 42 and thus permits the fluid to span out in a direction transverse to the direction of the incoming fluid passing through orifice 50. As can be seen from FIGS. 4 and 5, the flow conditioning element 42 includes the ring shaped supporting structure 46 which merges into the conical dispersing region 60 formed by the cone 52. Fluid entering the flow conditioning element 42 is permitted to pass in a restricted direction transverse to the original direction of the fluid flow through the orifice 50. This feature being better illustrated in FIG. 6.

Figure 6:
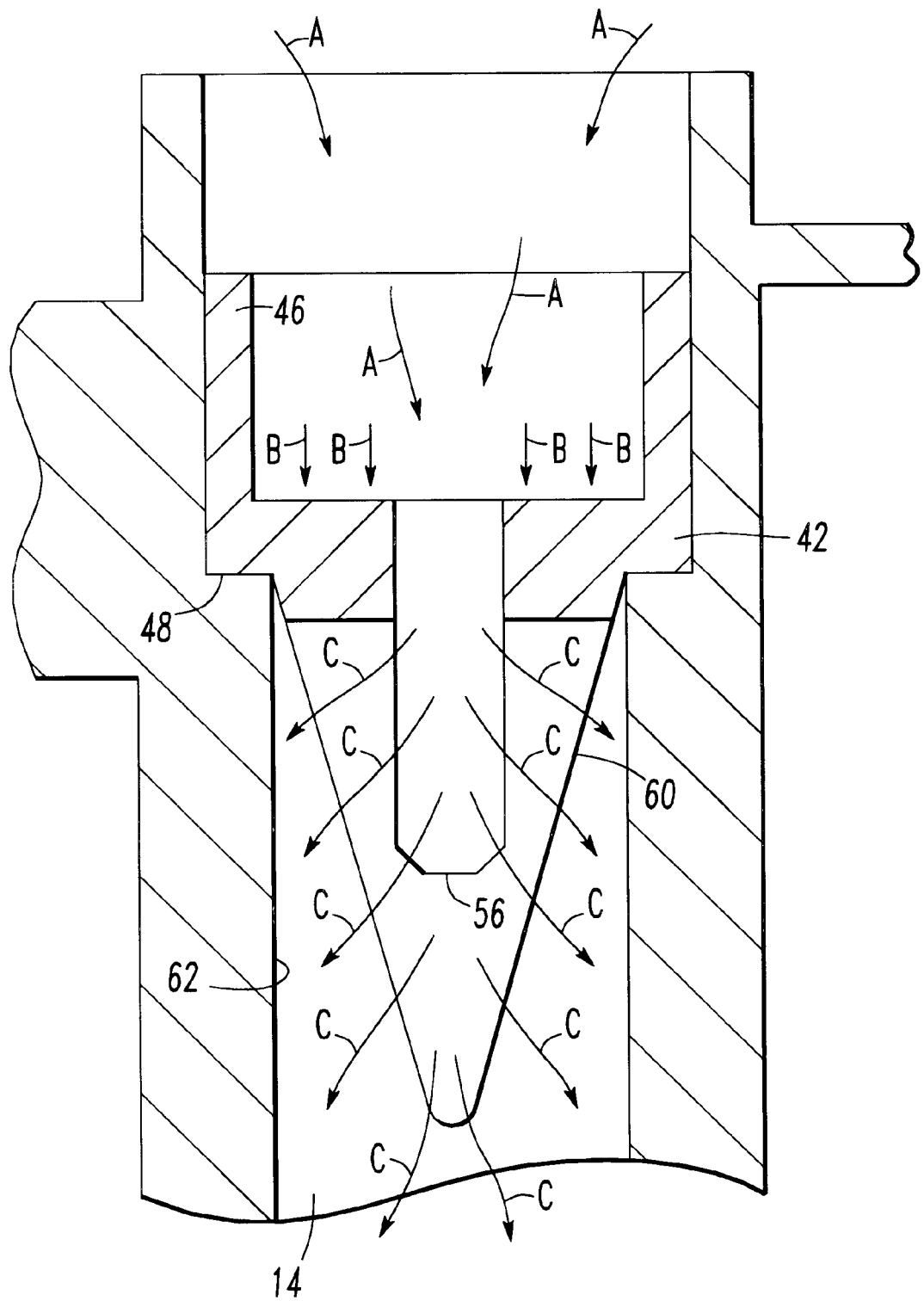
FIG. 6 is a cross-sectional view of the noise reduction device in accordance with the present invention illustrating the flow path of fluid passing therethrough.

FIG. 6 is cross-sectional view of the flow conditioning element 42 positioned within the outlet flow passage 14. This cross-sectional view being rotated 90° from that illustrated in FIG. 3. As is readily apparent, fluid flowing in the directions of arrows A when the diaphragm 16 is displaced passes into the orifice 50 and also exerts pressure in the direction of arrows B on the upper surface 54 of the flow conditioning element 42. As the fluid passes through the orifice 50, the fluid is expelled in a radially outward direction towards the side wall 62 of the outlet passage 14. This being carried out in the direction of arrows C. In doing so, the fluid passing through the orifice 50 is spanned out in a fan like manner as it proceeds to the edge or the nose of the channel. In this case, the flow rate of fluid passing into the spanning area 62 of the flow conditioning device 42 is substantially reduced which results in a significant reduction in the audible sound generated by the fluid passing through the outlet passage 14. With the element 42, fluid passing from the high pressure fluid inlet to the lower pressure fluid outlet is somewhat restrained and consequently the noise generated in the splash zone is reduced.

It will be appreciated that the various dimensions of the flow conditioning element 42 may be adjusted in order to achieve the particular desired reduction in noise generated in the splash zone.

For example, one particular application of the flow conditioning element 42 is illustrated in FIG. 7. Therein, the outside diameter of the support structure 46 is approximately 0.382 inches while the inside diameter of the support structure is approximately 0.298 inches. Initially, the flow control orifice 50 is of a diameter of 0.110 inches while the slot 58 is of a dimension of 0.033 inches. This particular structure had been found to be beneficial in use in the valve illustrated in FIG. 2. Such a valve may experience input pressures in a range of 20 to 300 psi with the flow conditioning element 42 being capable of reducing the audible impact of the fluid passing through such valve under this range of pressures.

Accordingly, as can be seen from the foregoing discussion, the present invention provides a flow conditioning element positioned in a manner so as to provide a substantially constant flow rate from a control valve while reducing the audible noise generated in the splash zone of the control valve. Accordingly, by selecting the optimum dimensions of the flow conditioning element 42, a flow control valve having an overall reduction in noise associated with the operation of such valve can be achieved.

While the present invention has been described with reference to a preferred embodiment, it will be appreciated by those skilled in the art that the invention may be practiced otherwise and as specifically described herein without departing from the spirit and scope of the invention. It is, therefore, to be understood that the spirit and scope be limited only by the appended claims.

We claim:

1. A dispensing valve for dispensing a liquid comprising:
   a valve housing having a fluid inlet and a fluid outlet;
   a sealing means fixedly secured to said housing for sealing engaging a valve seat positioned about said fluid outlet for providing selective fluid communication between said fluid inlet and said fluid outlet; and
   a flow control means positioned in said fluid outlet for providing a substantially quiet and constant flow of fluid through the fluid outlet, said flow control means including a high pressure region and a low pressure region downstream of said high pressure region, said high pressure region of said flow control means including a flow control orifice having an inside diameter less than a diameter of said fluid outlet and said low pressure region has a first dimension less than said inside diameter of said orifice and a second dimension greater than said inside diameter of said orifice, with said second dimension being transverse to said first dimension.

2. The valve as defined in claim 1, wherein said low pressure region of said flow control means overlaps said high pressure region of said flow control means.

3. The valve as defined in claim 1, wherein a body of said flow control means includes a substantially cylindrical portion and a substantially conical portion, said conical portion being positioned downstream of said cylindrical portion.

4. The valve as defined in claim 3, wherein said cylindrical portion includes said high pressure region.

5. The valve as defined in claim 4, wherein said conical portion includes said low pressure region.

6. The valve as defined in claim 3, wherein said low pressure region of said flow control means overlaps said high pressure region of said flow control means within said conical portion.

7. The valve as defined in claim 1, wherein said low pressure region bisects said conical portion in a direction of said second dimension.

8. A flow control device for providing a substantially quiet and constant flow of fluid through a fluid passage comprising;
   a housing;
   a high pressure region including a flow control orifice formed in said housing; and
   a low pressure region formed in said housing downstream of said high pressure region;
   wherein said high pressure region overlaps said low pressure region within said housing.

9. The flow control device as defined in claim 8, wherein said orifice has a predetermined inside diameter.

10. The flow control device as defined in claim 9, wherein said low pressure region has a first dimension less than said inside diameter of said orifice and a second dimension greater than said inside diameter of said orifice, with said second dimension being transverse to said first dimension.

11. The flow control device as defined in claim 10, wherein said housing includes a substantially cylindrical portion and a substantially conical portion.

12. The flow control device as defined in claim 11, wherein said cylindrical portion includes said high pressure region.

13. The flow control device as defined in claim 9, wherein said conical portion includes said low pressure region.

14. The flow control device as defined in claim 13, wherein a flow rate of fluid passing through said housing is controlled by said flow control orifice and is directed outwardly from said flow control orifice toward said fluid passage.

* * * * *